United States Patent
Nakajima et al.

(10) Patent No.: US 8,997,713 B2
(45) Date of Patent: Apr. 7, 2015

(54) THROTTLE BODY CONFIGURED TO PROVIDE TURBULENT AIR FLOW TO A COMBUSTION CHAMBER OF AN ENGINE, AND ENGINE INCLUDING SAME (75) Inventors: Yasuaki Nakajima, Saitama (JP); Tetsuya Nakayasu, Saitama (JP); Natsuki Miyashita, Saitama (JP); Makoto Kashiwabara, Saitama (JP); Hidetoshi Wakasa, Saitama (JP); Koji Matsui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 540 days.

(21) Appl. No.: 13/405,877

(22) Filed: Feb. 27, 2012

(65) Prior Publication Data
US 2012/0222650 A1 Sep. 6, 2012

(30) Foreign Application Priority Data

Mar. 2, 2011 (JP) ................................ 2011-044799

(51) Int. Cl.
F02B 31/06 (2006.01)
F02B 31/08 (2006.01)
F02D 9/10 (2006.01)

(52) U.S. Cl.
CPC ............ F02D 9/1025 (2013.01); F02B 31/085 (2013.01); F02B 2275/48 (2013.01); Y02T 10/125 (2013.01); Y02T 10/146 (2013.01)

(58) Field of Classification Search
CPC ........ F02B 31/06; F02B 31/08; F02D 9/1025; F02D 9/103
USPC ............ 123/188.14, 305, 306, 308, 337, 432; 251/305
See application file for complete search history.

(56) References Cited

U.S. PATENT DOCUMENTS

| | | | | | |
|---|---|---|---|---|---|
| 4,336,776 | A | * | 6/1982 | Sumiyoshi et al. | 123/306 |
| 4,436,281 | A | * | 3/1984 | Chiron | 251/305 |
| 4,489,917 | A | * | 12/1984 | Baumann | 251/305 |
| 4,700,669 | A | * | 10/1987 | Sakurai et al. | 123/188.14 |
| 4,909,210 | A | * | 3/1990 | Shimada et al. | 123/308 |
| 5,551,392 | A | * | 9/1996 | Yamaji et al. | 123/306 |
| 5,704,324 | A | * | 1/1998 | Ichinose et al. | 123/179.18 |
| 5,732,380 | A | * | 3/1998 | Iwata | 701/85 |
| 6,295,815 | B1 | * | 10/2001 | Bechle et al. | 60/605.2 |
| 7,958,863 | B2 | * | 6/2011 | Abe et al. | 123/306 |
| 8,245,688 | B2 | * | 8/2012 | Uda | 123/306 |
| 2002/0005185 | A1 | * | 1/2002 | Schatz | 123/403 |
| 2008/0035107 | A1 | * | 2/2008 | Torii | 123/336 |
| 2008/0072873 | A1 | * | 3/2008 | Kuhnel et al. | 123/319 |
| 2009/0229557 | A1 | * | 9/2009 | Abe et al. | 123/184.56 |

FOREIGN PATENT DOCUMENTS

JP 2005-042655 A 2/2005

* cited by examiner

Primary Examiner — Erick Solis
(74) Attorney, Agent, or Firm — Carrier Blackman & Associates, P.C.; William D. Blackman; Joseph P. Carrier

(57) ABSTRACT

A vehicular air intake is configured to produce a turbulent intake air flow in a cylinder of an engine. The air flow may be provided as a vortex. A throttle valve, for controlling an amount of intake air provided to the engine, has a pivot shaft with an axis which is offset from a center axis of an air intake passage in which the throttle valve is installed, and a throttle plate affixed to the pivot shaft. The pivot axis is offset and spaced away from the central axis of the throttle body such that a first portion of a throttle plate disposed on a first side of the pivot shaft, is larger than a second portion of the throttle plate disposed on a second side of the pivot shaft. This arrangement provides the non-uniform turbulent air flow into the engine.

4 Claims, 5 Drawing Sheets

COMPARATIVE EXAMPLE

THROTTLE BODY CONFIGURED TO PROVIDE TURBULENT AIR FLOW TO A COMBUSTION CHAMBER OF AN ENGINE, AND ENGINE INCLUDING SAME

CROSS-REFERENCE TO RELATED APPLICATIONS

The present invention claims priority under 35 USC §119 based on Japanese patent application No. 2011-044799, filed on Mar. 2, 2011. The entire subject matter of this priority document, including specification claims and drawings thereof, is incorporated by reference herein.

BACKGROUND OF THE INVENTION

1. Field of the Invention

The present invention relates to an air intake device for regulating airflow in an air intake passage of an engine. More particularly, the present invention relates to a vehicular throttle body configured to generate turbulent airflow in a stream of incoming intake air flowing into a cylinder of the engine.

2. Description of the Background Art

There is known a vehicle which is provided with an engine, having air intake ports communicating with an air intake passage and which route air into a cylinder of the engine via a throttle body having a throttle valve pivoting around an axis transverse to a central axis of the air intake passage of the engine, and controlling an intake air amount. For example, Japanese published patent application JP-A 2005-42655 describes a vehicle having two throttle valves, in which a pivot shaft center of a first throttle valve, disposed on an upstream side, intersects with a pivot shaft center of a second throttle valve disposed on a downstream side, when viewed in a longitudinal direction of an air intake passage. According to the structure described in this reference, it is possible to produce a swirl in incoming intake air supplied to a cylinder from one of the air intake ports, thus making it possible to improve a combustion state.

However, in the conventional structure described in the above reference, an air intake system having two throttle valves is required, so that a wide space for layout of the air intake system is required, and the number of parts is increased. In addition, since separate coordinated controls are required for each of the two throttle valves, there is a problem that control of the two throttle valves becomes complex.

SUMMARY OF THE INVENTION

The present invention has been made in view of the problems with the known art, and it is an object of the present invention to provide a vehicular air intake control device having a simple structure, and which is operable to produce a vortex flow in a stream of incoming intake air to a cylinder.

It is another object of the present invention to provide a vehicular air intake control device which does not require coordinated control of two separate throttle valves, but which is operable to produce a vortex flow in a stream of incoming intake air to a cylinder.

In order to solve the above-mentioned problems, an illustrative embodiment of the present invention provides an air intake device of a vehicle, provided with an engine (E), having an air intake port (31) continued in an air intake passage (KT) and routing air into a cylinder (12A) via an air intake valve (32), and a throttle valve (42) pivoting around an axis transverse to the air intake passage (KT) of the engine (E) and controlling an intake air amount, in which the throttle valve (42) is disposed with a pivot shaft (42A) thereof being made offset from a center axis (B1) of the air intake passage (KT).

According to this structure, the throttle valve which controls an intake air amount is disposed with the pivot shaft thereof being made offset from the center axis of the air intake passage, so that it is possible to cause a vortex flow to be easily produced in the cylinder and to improve a combustion state, with the simple structure in which a position of the pivot shaft of the throttle valve is made eccentric.

In the above structure, the pivot shaft (42A) of the throttle valve (42) may be disposed in a direction perpendicular to the cylinder (12A) and made offset relative to the center axis (B1) of the air intake passage (KT) along a cylinder axis (A1). According to this structure, it is possible to produce a difference between amounts of intake air passing both ends of the throttle valve as viewed in a sectional view along the cylinder axis and to cause a tumble flow to be easily produced in the cylinder.

In this case, the pivot shaft (42A) of the throttle valve (42) may be made offset to a side increasing intake air that is supplied to a neighborhood of a center of a ceiling of the cylinder (12A) from the air intake port (31) along the cylinder axis (A1). According to this structure, it is possible to cause a vortex flow to be easily produced in the cylinder and to improve the combustion state.

In addition, in the above structure, the pivot shaft (42A) of the throttle valve (42) may be inclined relative to an axis (C1) perpendicular to the cylinder axis (A1). According to this structure, it is possible to cause vortex flows including a swirl flow to be easily produced in the cylinder, with the simple structure in which the position of the pivot shaft of the throttle valve is made eccentric and rotated, and it is possible to improve the combustion state.

In this case, two air intake ports (31) may be provided, and the pivot shaft (42A) of the throttle valve (42) may be inclined relative to the axis (C1) perpendicular to the cylinder axis (A1) in such a manner to increase intake air, supplied into one of the air intake ports (31), as compared to intake air supplied into the other one of the air intake ports (31). According to this structure, it is possible to cause the swirl flow to be easily produced.

In addition, in the above structure, the throttle valve (42) may be disposed adjacent to the air intake ports (31) of the engine (E). According to this structure, it is possible to cause the air intake amount of the cylinder to be rapidly varied according to the opening and closing of the throttle valve and it is possible to send the cylinder intake air, whose balance has been varied by the throttle valve, as it is. Therefore, it is possible to realize improvement in an operability of the engine and improvement in the combustion state.

According to an illustrative embodiment of the present invention, the throttle valve which controls the intake air amount is disposed with the pivot shaft thereof being made offset from the center axis of the air intake passage, so that it is possible to cause the vortex flow to be easily produced in the cylinder, with the simple structure in which the position of the pivot shaft of the throttle valve is made eccentric, and it is possible to improve the combustion state.

In addition, when the pivot shaft of the throttle valve is disposed in the direction perpendicular to the cylinder and made offset relative to the center axis of the air intake passage along the cylinder axis, a difference can be produced between amounts of intake air passing the both ends of the throttle valve when viewed in a sectional view along the cylinder axis, thus causing the tumble flow to be easily produced.

In addition, when the pivot shaft of the throttle valve is made offset to the side increasing intake air that is supplied to the neighborhood of the center of the ceiling of the cylinder from the air intake port along the cylinder axis, it is possible to cause the vortex flow to be easily produced in the cylinder and it is possible to improve the combustion state.

In addition, when the pivot shaft of the throttle valve is inclined relative to the axis perpendicular to the cylinder axis, it is possible to cause the vortex flows, including the swirl flow, to be easily produced in the cylinder, with the simple structure in which the position of the pivot shaft of the throttle valve is made eccentric and rotated, and it is possible to improve the combustion state.

In addition, when the at least one air intake port is composed of two air intake ports and the pivot shaft of the throttle valve is inclined relative to the axis perpendicular to the cylinder axis in such a manner to increase the intake air, supplied to one of the air intake ports, as compared to the intake air supplied into the other one of the air intake ports, it is possible to cause the swirl flow to be easily produced.

In addition, when the throttle valve is disposed adjacent to the air intake ports of the engine, it is possible to cause the intake air amount of the cylinder to be rapidly varied according to the opening and closing of the throttle valve and it is possible to send the cylinder the intake air, whose balance has been varied by the throttle valve, as it is and it is possible to realize the improvement in the operability of the engine and the improvement in the combustion state.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Selected illustrative embodiments of the present invention will now be described, with reference to the drawings.

First Embodiment

Figure 1:
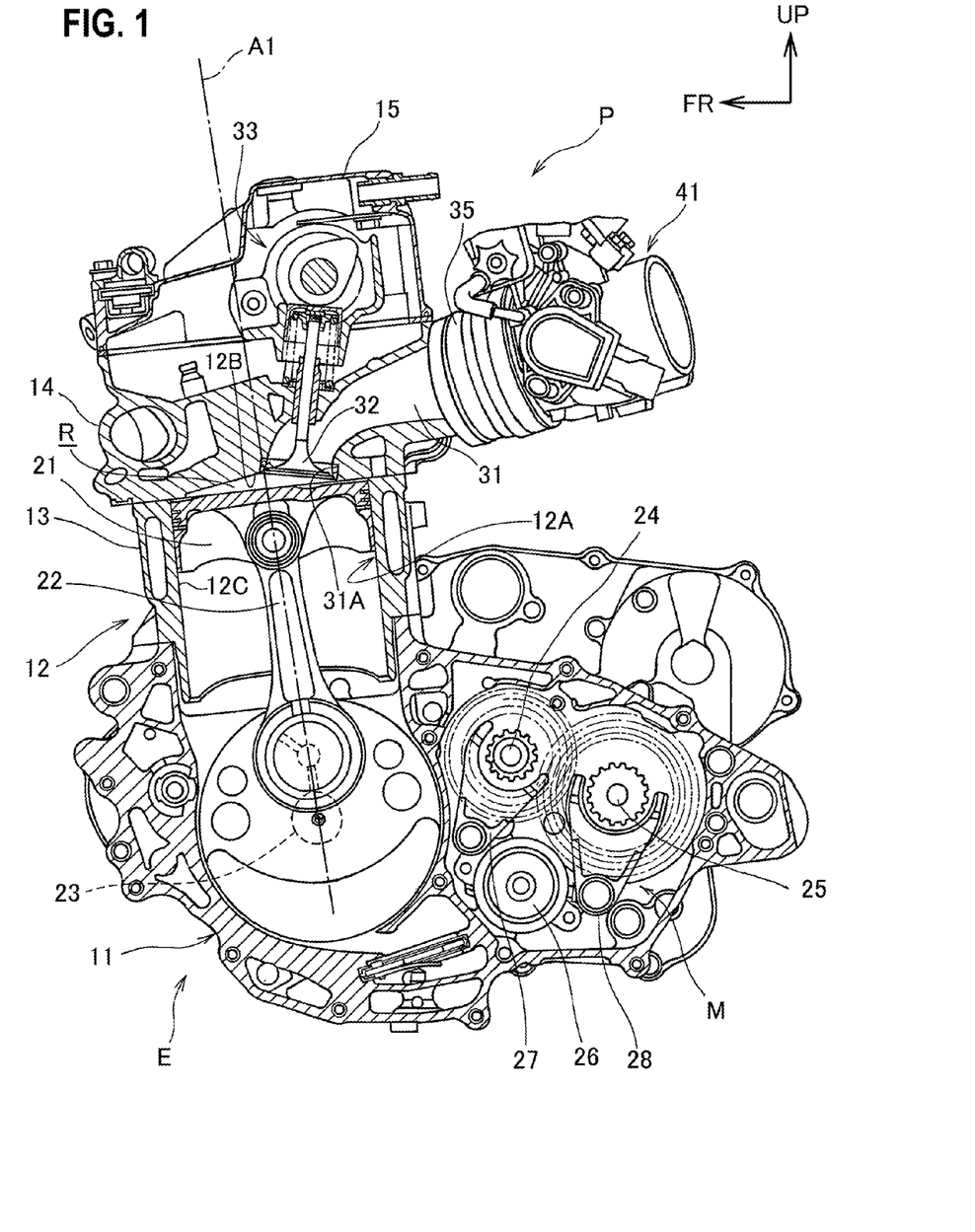
FIG. 1 is a view illustrating a power unit which is provided with an air intake device according to a first embodiment of the present invention.

FIG. 1 is a cross-sectional view of a power unit P which is provided with an intake airflow control apparatus according to a first embodiment of the present invention.

This power unit P is a power unit provided for installation in a motorcycle, and integrally provided with an engine (internal combustion engine) E and a transmission M provided in a crankcase of the engine E. Incidentally, in the drawings, reference sign FR indicates a forward direction, and reference sign UP indicates an upward direction, in the case where the power unit P is installed in the motorcycle. In the following explanation, front, rear, left, right, upward and downward directions indicate the same as directions with respect to a vehicle body, unless otherwise specifically indicated. It should be understood that these terms are used for purposes of illustration, and are not intended to limit the invention.

The engine E is provided with a crankcase 11 and a cylinder portion 12. In the depicted embodiment shown in FIG. 1, the engine E is a single-cylinder four-cycle engine provided with a single cylinder (also called a cylinder bore) 12A in the cylinder portion 12.

The cylinder portion 12 is provided with a cylinder block 13, a cylinder head 14, and a head cover 15. A piston 21 is slidably housed in the cylinder 12A of the cylinder portion 12. A crankshaft 23, which is connected to the piston 21 via a connecting rod 22, is rotatably supported on the crankcase 11.

The transmission M includes a main shaft 24 and a counter shaft 25, which are each rotatably supported on the crankcase 11 in parallel with the crankshaft 23. A plurality of gear rows are provided at the main shaft 24 and the counter shaft 25, and these gear rows are meshed with each other to form a plurality of shift positions. With respect to the transmission M, any one of the shift positions is selected by a pair of shift forks 27, 28 operated by rotation of a shift drum 26.

Rotary movement of the engine E (rotation of the crankshaft 23) is transmitted to the main shaft 24 and, thereafter, is transmitted to the counter shaft 25 at a predetermined transmission gear ratio. Rotation of the counter shaft 25 is transmitted to a drive wheel (rear wheel) of the motorcycle. Incidentally, while the counter shaft 25 is also used as an output shaft of the power unit P in this power unit P, the present invention is not limited to this case and any output shaft which is independent of the counter shaft 25 may be provided.

Intake and exhaust valves provided in the cylinder head 14 are operable to close an opening of the cylinder 12A, to thereby form a combustion chamber R together with the piston 21. In the depicted embodiment shown in FIG. 1, the engine E has four valves provided to the cylinder 12A. In the cylinder head 14, two air intake ports 31 and two air exhaust ports (not shown) which open into a combustion chamber R are formed, and an air intake valve 32, which opens and closes the air intake ports 31, and an air exhaust valve (not shown) which opens and closes the air exhaust port are also provided. In addition, a valve train 33, which drives the respective valves, is arranged between the cylinder head 14 and the head cover 15.

Figure 2:
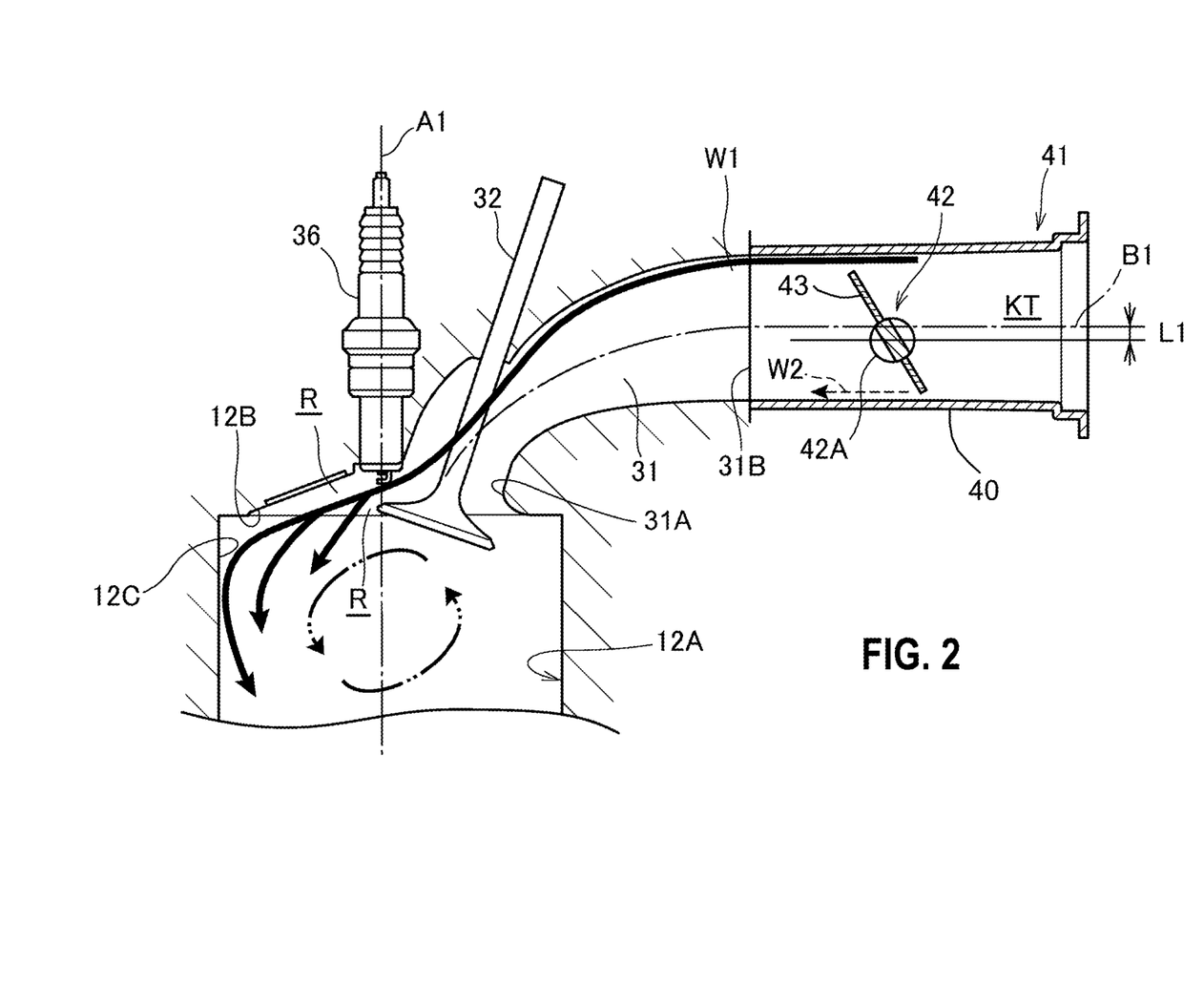
FIG. 2 is a view which shows an air intake passage together with a peripheral structure.

FIG. 2 is a cross-sectional detail view which shows an air intake passage of the engine E, together with a peripheral structure.

As shown in FIGS. 1 and 2, the air intake port 31 is formed inside of the cylinder head 14 defining a curved air intake passage which extends upward substantially along an axis A1 of the cylinder 12A (cylinder axis) from an opening end 31A opening into the combustion chamber R. The air intake port 31 is curved so as to feed air inwardly toward the cylinder axis A1, and extends rearwardly from the opening end 31A. Each of the air intake ports 31 has an inlet opening end 31B (refer to FIG. 2) formed therein which acts as an air inlet of the engine E, and this opening end is provided at a back surface of the cylinder head 14.

A single throttle body (air intake device) 41 is connected to respective inlet opening ends 31B of the two air intake ports 31 via an air intake pipe 35. Air which is cleaned by an air cleaner (not shown) is supplied to the engine E via the throttle body 41. That is, the throttle body 41 forms an air intake passage between the air cleaner and the engine E.

A fuel injection system (not shown) which supplies fuel to the combustion chamber R (cylinder 12A) includes a fuel injector which is either attached to the throttle body 41 or located downstream of the throttle body 41. The fuel and air are supplied to the engine E.

In addition, a spark plug 36 (refer to FIG. 2) is attached to the cylinder head 14 in conventional fashion, with a tip end thereof facing toward a central portion (position which the cylinder axis A1 passes) of the combustion chamber R. The spark plug 36 is adapted to be electronically controlled and timed by an ignition system (not shown) of the engine.

As shown in FIG. 2, the throttle body 41 includes a hollow, cylindrical main body member 40 having a butterfly-type throttle valve (air intake throttle valve) 42 provided therein. The throttle valve 42 includes a throttle plate 43 which is affixed to, and pivoted on a pivot shaft 42A, as a fulcrum, to thereby open the air intake passage KT until it becomes a substantially fully opened state from a substantially fully closed state, and varies an amount of intake air to be supplied into the engine E, or an intake air amount. The pivot shaft 42A is offset from, and disposed substantially transverse to a central axis B1 of the throttle body 41.

As shown in the same figure, the throttle body 41 is arranged adjacent to the inlet opening end 31B acting as the air inlet of the engine E, and the intake air amount is made variable in the neighborhood of the air inlet of the engine E. Therefore, it is possible to cause the intake air amount of the engine E to be rapidly varied according to the opening and closing of the throttle valve 42, and it is possible to cause an engine output to be rapidly varied according to throttle operation by an occupant (rider).

In addition, in this embodiment, the pivot shaft 42A of the throttle valve 42, which is arranged adjacent to the engine E, is disposed offset from a central axis B1 of the throttle body 41 defined by the throttle body 41.

Figure 3A:
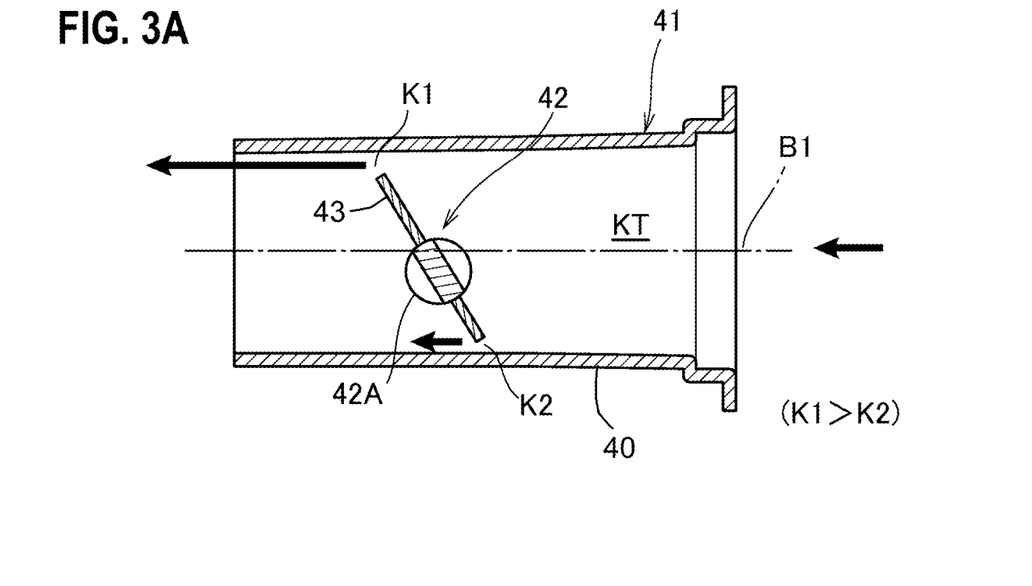
FIG. 3A is a view which shows a state where a throttle valve is opened by a pivot shaft which is made offset and FIG. 3B is a view which illustrates a state where the throttle valve is opened by a pivot shaft which is not made offset.
Figure 3B:
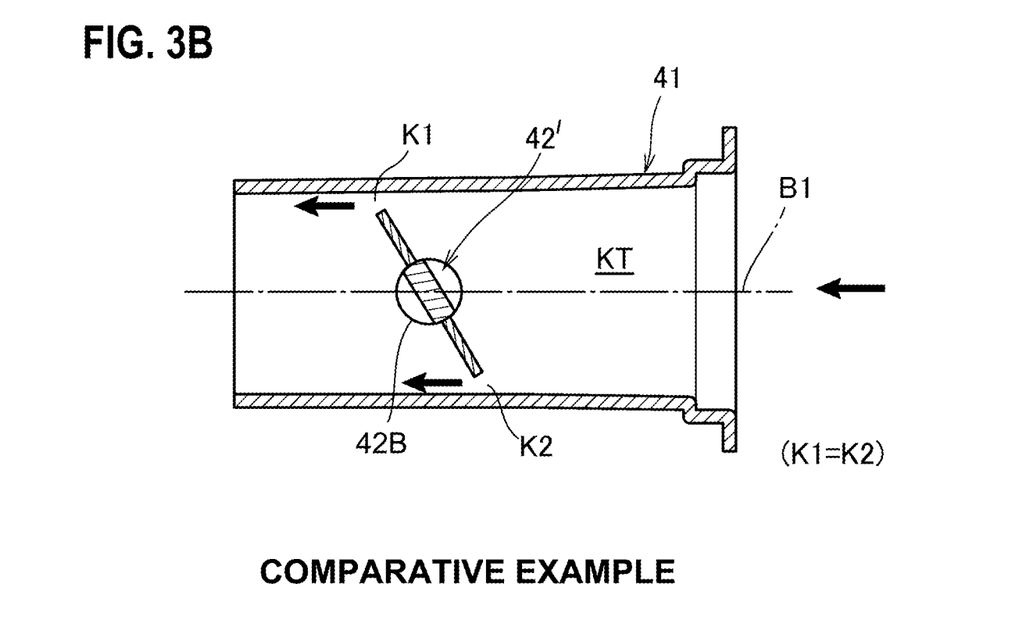

FIG. 3A shows a state where the throttle valve 42 is opened by the pivot shaft 42A which is made offset according to the illustrative embodiment. FIG. 3B illustrates a state according to a comparative example, where a modified throttle valve 42' is opened by a pivot shaft 42B which is not made offset.

The throttle valve 42 is pivoted on the pivot shaft 42A as the fulcrum, so that in the case where the pivot shaft is made offset as shown in FIG. 3A, when the throttle valve 42 is opened, a difference is produced between amounts of openings (opening areas) K1, K2 formed at both ends of the throttle valve 42 as viewed in a sectional view perpendicular to the pivot shaft 42A. Therefore, the side with a large opening amount (opening amount K1) allows more air to pass, as compared to the side with a small opening amount (opening amount K2) and the air amounts at the both ends of the throttle valve 42 become unbalanced.

On the other hand, in the case of the comparative example where the pivot shaft 42B is not made offset as shown in FIG. 3B, when the throttle valve 42' is opened, the amounts of the openings (opening areas) K1, K2 formed at the both ends of the throttle valve 42 as viewed in the sectional view perpendicular to the pivot shaft 42A are always the same, and the air amounts at the both ends of the throttle valve 42' are substantially balanced.

Namely, when the pivot shaft 42A of the throttle valve 42 is made offset from the central axis B1 of the throttle body 41, a difference can be produced between the air amounts at upper and lower ends of the throttle valve 42. In addition, the throttle valve 42 is arranged adjacent to the air intake port 31 of the engine E, so that it is possible to route the air, in the state where the difference in the air amounts kept, into the engine E. Therefore, a flow of the intake air mixed with fuel (air-fuel mixture) becomes strong in a specified direction in the combustion chamber R, and a vortex can be produced.

More concretely, in this structure, as shown in FIG. 2, the pivot shaft 42A of the throttle valve 42 extends in a direction substantially perpendicular to the cylinder axis A1 (corresponding to a width direction of the power unit P), and made offset to one side (lower side) along the cylinder axis A1.

According to this structure, the difference in the air amounts is produced between one side (lower side) of the central axis B1 of the throttle body 41 as the boundary when viewed in the sectional view along the cylinder axis A1, and the other side (upper side), and intake air which is supplied to the neighborhood of a center of a ceiling of the combustion chamber R from the air intake ports 31 (referred to as "port upper side intake air" (first intake air) W1) becomes more increased than intake air which is supplied to a region of the combustion chamber R that is remote from the center of the ceiling of the combustion chamber R from the air intake ports 31 (referred to as "port lower side intake air" (second intake air) W2).

Therefore, in the combustion chamber R, a flow of the port upper side intake air W1 becomes dominant, and intake air that is mixed with fuel (air-fuel mixture) is guided to a ceiling surface 12B of the combustion chamber R from the center of the ceiling of the combustion chamber R, flows to a wall surface 12C of the combustion chamber R, flows toward a bottom surface (piston 21) while being guided by the wall surface 12C, and changes its orientation to an orientation toward the ceiling surface 12B at the bottom surface (piston 21). Thereby, a vortex-tumble flow that is a vertical vortex flow can be produced in the combustion chamber R. Without wishing to be bound by any theory, it is believed that combustion can be promoted by this turbulent in-cylinder air flow, and a combustion state is improved.

In addition, when an offset amount L1 of the pivot shaft 42A of the throttle valve 42 is changed, a difference in air volumes between the port upper side intake air W1 and the port lower side intake air W2 can be changed. By adjusting the offset amount L1, it is possible to modify the properties of the vortex flow to advantageously improve combustion.

Referring now to FIG. 2, there is illustrated a case where a throttle valve opening is set to 20 degrees. However, when the throttle valve opening is between zero and 90 degrees, it is possible to unbalance the air intake. In particular, the balance of the air amount is changed as the throttle valve opening becomes a lower opening, so that the tumble flow can be efficiently produced at the time of low output of the engine, and the combustion state at the time of the low output of the engine can be efficiently improved.

As explained above, according to this embodiment, the pivot shaft 42A of the throttle valve 42 is disposed offset from the central axis B1 of the throttle body 41, so that it is possible to cause the vortex flow to be easily produced in the cylinder 12A, with the simple structure in which the position of the pivot shaft 42A of the throttle valve 42 is merely made eccentric, and it is thereby possible to improve the combustion state.

In addition, the pivot shaft 42A of the throttle valve 42 is arranged in the direction perpendicular to the cylinder 12A and is made offset relative to the central axis B1 of the throttle body 41 along the cylinder axis A1, so that it is possible to produce the difference in the amounts of the intake air passing the both ends of the throttle valve 42 as viewed in the sectional view taken along the cylinder axis A1, and it is possible to cause the tumble flow to be easily produced in the cylinder 12A.

In addition, the pivot shaft 42A is made offset to the side on which the intake air (port upper side intake air W1) that is supplied to the neighborhood of the center of the ceiling of the cylinder 12A from the air intake port 31 along the cylinder axis A1 is increased, so that it is possible to cause the vortex flow to be more easily produced in the cylinder 12A and it is possible to improve the combustion state. In this case, the spark plug 36 is arranged on the center of the ceiling of the cylinder 12A, whereby the air-fuel mixture can collectively flow toward the spark plug 36, to thereby improve the combustion sate.

In addition, in the engine E according to this structure, the throttle valve 42 is arranged adjacent to the air intake port 31, so that it is possible to rapidly change the amount of the intake air of the cylinder 12A according to the opening and closing of the throttle valve 42, and it is possible to send into the cylinder 12A the intake air, whose balance has been changed by the throttle valve 42, as it is. Therefore, improvement of operability of the engine E and improvement of the combustion state can be realized.

Second Embodiment

Figure 4A:
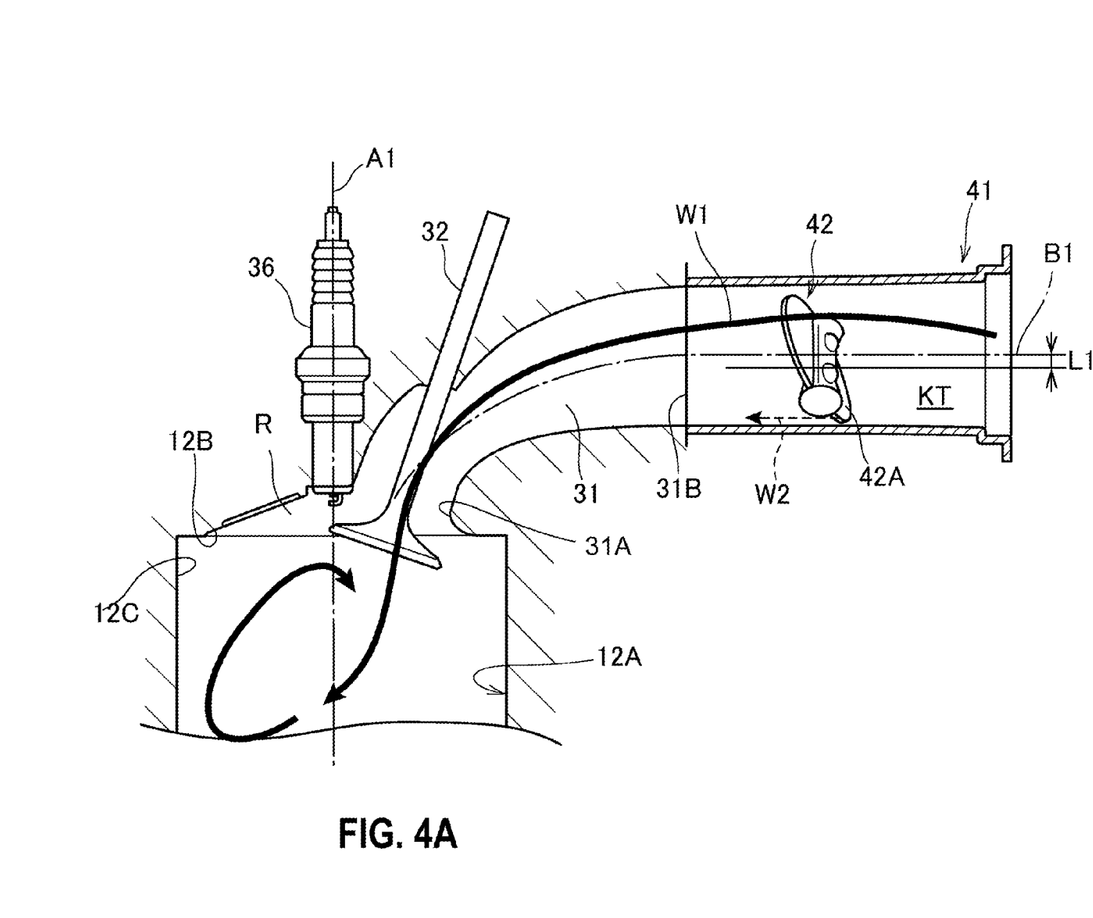
FIG. 4A is a view which illustrates an air intake passage of a second embodiment together with a peripheral structure and FIG. 4B is a view which shows the throttle valve as viewed from a vehicle body rear side.
Figure 4B:
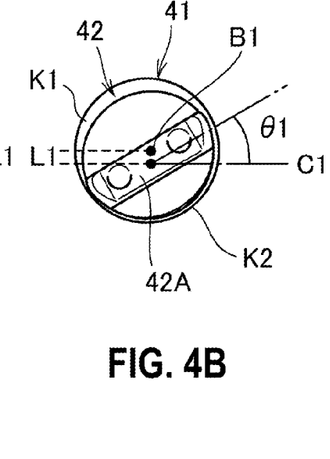
Figure 5:
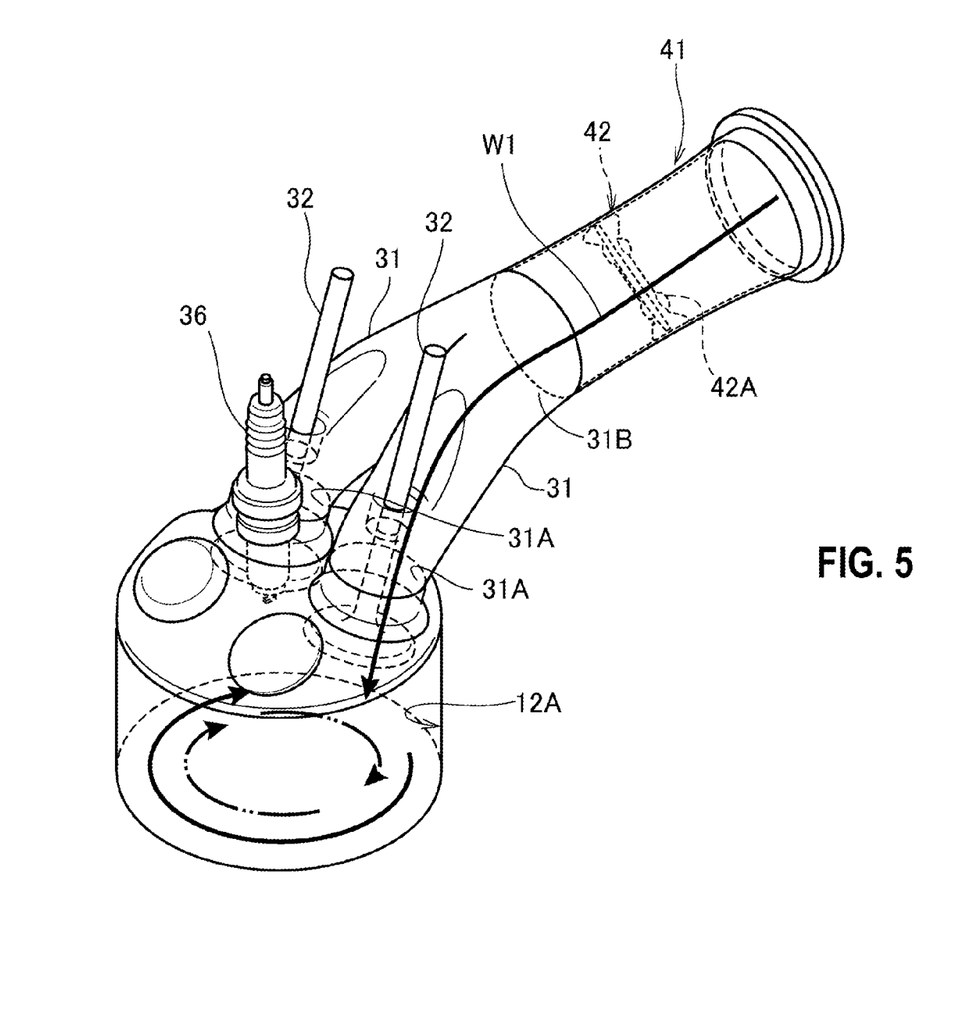
FIG. 5 is a perspective view which shows the air intake passage together with the peripheral structure, as viewed from an oblique upward direction.

FIGS. 4A and 4B and FIG. 5 illustrate a modified embodiment of the present invention. Specifically, FIG. 4A is a cross-sectional detail view which shows an air intake passage KT of an engine E together with a peripheral structure. FIG. 4B is an end plan view of a throttle valve 42 as viewed from a vehicle body rear side. FIG. 5 is a perspective view of the air intake passage KT together with the peripheral structure, as viewed from an oblique upward direction.

The second embodiment is different from the first embodiment in that a pivot shaft 42A of the throttle valve 42 is inclined by an angle θ1 relative to a horizontal axis C1 which is an axis perpendicular to a cylinder axis A1. This angle θ1 is set within an acute angle range (0°<θ1<90°) and is 30° in this embodiment.

In the case where, in this way, the pivot shaft 42A of the throttle valve 42 is made offset along the cylinder axis A1 and inclined by the angle θ1 relative to the horizontal axis C1, a difference in left and right opening amounts (opening areas) K1, K2 of the throttle valve 42 as viewed in a sectional view perpendicular to the pivot shaft 42A is produced (K1>K2) as shown in FIG. 4B and air amount can be unbalanced upward, downward, left and right of an air intake port 31.

More concretely, in this embodiment, the pivot shaft 42A of the throttle valve 42 is made offset to one side (lower side) along the cylinder axis A1 and is also inclined by the angle θ1 relative to the horizontal axis C1, whereby the first intake air W1 that flows the upper side and one of left and right sides of the air intake port 31 is made more increased than the other intake air (second intake air W2 flowing the lower side and the other one of the left and right sides of the air intake port 31).

Therefore, the first intake air W1 becomes dominant and, as shown in FIG. 5, it is possible to supply more intake air to one of the two air intake ports 31 than to the other. Therefore, as shown in FIGS. 4A-4B and 5, vortexes which include the tumble flow that is the vertical vortex flow, and a swirl flow swirled around the cylinder axis A1 can be produced in a combustion chamber R, in-cylinder flow can be produced more easily, and the combustion state can be more improved.

According to this embodiment, with the simple structure in which, in this way, the position of the pivot shaft 42A of the throttle valve 42 is made eccentric and is rotated, the swirl flow can be easily produced in the cylinder 12A, and the combustion sate can be improved.

In addition, the pivot shaft 42A of the throttle valve 42 is inclined in such a manner to allow the intake air supplied to one of the air intake ports 31 to be increased in relation to the intake air supplied to the other one of the air intake ports 31, so that it is possible to cause the swirl flow to be easily produced.

In addition, in this embodiment, when the angle θ1 is changed, the balance of the air amount influencing the swirl flow can be changed. By adjusting the angle θ1, it is possible to adjust the vortex flow to a vortex flow which is advantageous in the combustion promotion.

In addition, in this embodiment, like in the first embodiment, the throttle valve 42 is arranged adjacent to the air intake port 31, so that it is possible to rapidly change the intake air amount of the cylinder 12A according to the opening and closing of the throttle valve 42 and it is possible to send into the cylinder 12A the intake air, whose balance has been changed by the throttle valve 42, as it is. Therefore, it is possible to realize the improvement in the operability of the engine E and the improvement in the combustion state.

The above-mentioned embodiments are merely examples according to the present invention and optional variations and application are possible without departing from the gist of the present invention.

While the case where the present invention is applied to the air intake device of the four-cycle single-cylinder engine E in the above-mentioned embodiments has been explained, the present invention is not limited to this and can be widely applied to air intake devices of various engines.

The present invention is not limited to the case where it is applied to the air intake devices of motorcycles, and can be widely applied to air intake devices of saddle-ride type vehicles. Such saddle-ride type vehicles include all vehicles on which riders ride by straddling vehicle bodies, and including three-wheeled vehicles and four-wheeled vehicles, which are classified as ATVs (All Terrain Vehicles), as well as motorcycles (including motorbikes).

Although selected embodiments of the present invention have been described herein, the present invention is not limited to the above-mentioned embodiments, and various modifications are conceivable without departing from the present invention described in claims. Those skilled in the art will realize that many modifications of the illustrative embodiment could be made which would be operable. All such modifications, which are within the scope of the claims, are intended to be within the scope and spirit of the present invention.

What is claimed is:

1. A vehicular airflow control apparatus, comprising:
   an engine having an air intake port communicating with an air intake passage and selectively routing air into a cylinder via an intake valve, the air intake port comprising a first air intake port and a second air intake port; and
   a throttle body defining a portion of the air intake passage and having a throttle valve therein comprising a throttle plate affixed to a movable pivot shaft which pivots around a pivot axis transverse to a central axis of the throttle body, said throttle valve operable to control an intake air amount for said engine,
   wherein the pivot axis is offset from the central axis of the throttle body,
   wherein the pivot shaft of the throttle valve is inclined at an angle, relative to a crossing axis extending perpendicular to the cylinder axis, and wherein the airflow control apparatus is configured in such a manner to increase intake air supplied to the first air intake port, as compared to an amount of intake air supplied to the second air intake port.

2. The vehicular airflow control apparatus according to claim 1, wherein the throttle valve is disposed adjacent to the air intake port.

3. In an engine having a cylinder block with a cylinder formed therein with a cylinder axis, and cylinder head attached to the cylinder block and having an air intake port formed therein communicating with an air intake passage and selectively routing air into the cylinder, the improvement comprising:

the air intake port comprising a first air intake port and a second air intake port;

a throttle body defining a portion of the air intake passage and having a throttle valve therein comprising a throttle plate affixed to a movable pivot shaft which pivots around a pivot axis which is transverse to a central axis of the throttle body, said throttle valve operable to control an intake air amount for said engine, wherein the pivot axis is offset and spaced away from the central axis of the throttle body such that a first portion of the throttle plate disposed on a first side of the pivot shaft is larger than a second portion of the throttle plate disposed on a second side of the pivot shaft, wherein the pivot shaft of the throttle valve is inclined at an angle, relative to a crossing axis extending perpendicular to the cylinder axis, and wherein the airflow control apparatus is configured in such a manner to increase intake air supplied to the first air intake port, as compared to an amount of intake air supplied to the second air intake port.

4. The engine according to claim 3, wherein the throttle valve is disposed adjacent to the air intake port of the cylinder head.

* * * * *